United States Patent [19]

Kaiser

[11] 4,358,874
[45] Nov. 16, 1982

[54] RETAINING DEVICE

[75] Inventor: Theodore Kaiser, Bensenville, Ill.

[73] Assignee: Motorola, Inc., Schaumburg, Ill.

[21] Appl. No.: 203,072

[22] Filed: Oct. 31, 1980

[51] Int. Cl.³ ..................... F16B 41/00; A44B 21/00
[52] U.S. Cl. ....................................... 24/90.5; 24/97;
292/349; 403/12
[58] Field of Search .............. 24/90 R, 90.5, 97, 237,
24/245 A, 246, 101 B; 292/349, 353; 403/11,
12; 16/114 R

[56] References Cited

U.S. PATENT DOCUMENTS

| 295,769 | 3/1884 | Kalish | 24/90.5 |
| 462,143 | 10/1891 | Lamboley et al. | 24/97 |
| 2,745,458 | 5/1956 | Bedford, Jr. | 16/114 R |

Primary Examiner—Gene Mancene
Assistant Examiner—Robert P. Swiatek
Attorney, Agent, or Firm—Charles L. Warren

[57] ABSTRACT

A knob or similar object is rotatably retained on a piece of equipment by an arrangement including a four-section hinged member which may be concealed by the knob during normal usage. The hidden retaining member is captivated around the shaft at both ends by retaining devices and by the knob and enclosure wall until the knob is released. The arrangement is applicable regardless of whether the shaft remains on the equipment or forms a part of the retained object. The center sections of the hinged member fold up on one side of the shaft when hidden, but extend to allow release of the object from the normal, attached position.

14 Claims, 6 Drawing Figures

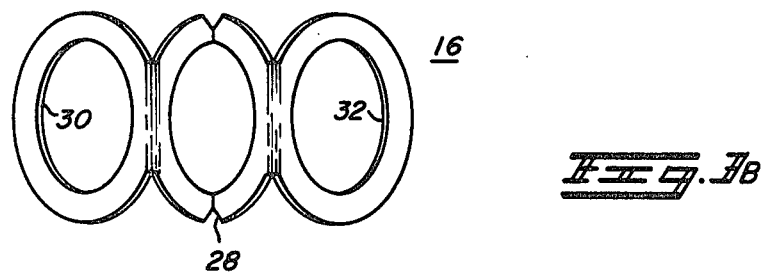
Fig. 3B
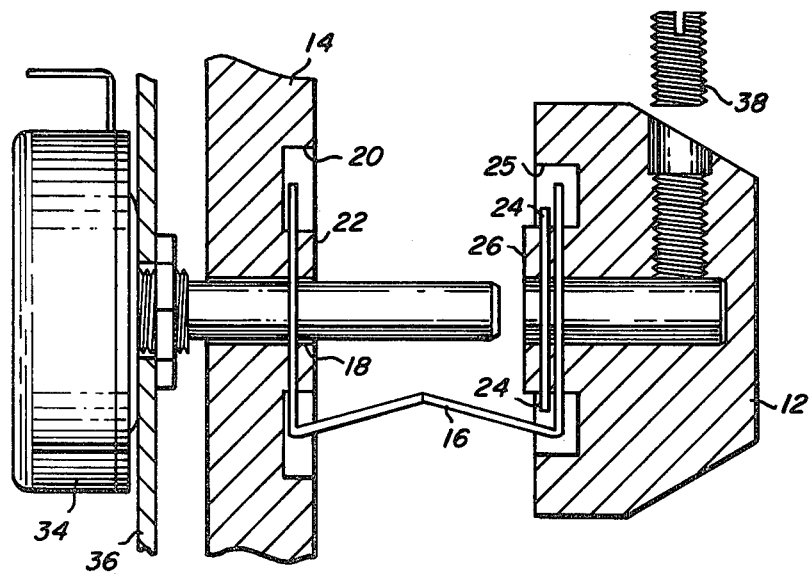
Fig. 3C
Fig. 4

RETAINING DEVICE

BACKGROUND OF THE INVENTION

This invention relates to the field of retaining devices which remain hidden in normal use and, more particularly, to the retention of an element such as a knob when the knob is removed from a support shaft, or when knob and shaft are removed together.

There are, in the art, many types of devices for retaining one object in the proximity of another object. These have included chains such as are used to retain the covers for exterior electrical outlets, and various springs and straps which retain bolts or screws in a "ready" position for reinsertion in mating holes. Some devices are retaining devices only when in tension, in the fully assembled condition. In the field of electrical equipment, there is a particular need for a device which could be attached to a knob and to the cabinet or chassis so that the knob can be released without being lost. The device will be unseen during normal use of the associated equipment, but will allow the knob to be released and swung away from the normal position. The device should be usable whether the knob and shaft are to be separated, or the shaft and knob are to be separated from the equipment.

SUMMARY OF THE INVENTION

It is therefore an object of the present invention to provide a retaining arrangement as for a knob on electrical equipment which will keep the knob in close proximity to the equipment when released from the normal or operative position.

It is a particular object to provide an arrangement which is unseen while in the operative position on the associated equipment.

These objects and others which will become apparent are obtained in a device in accordance with the present invention and including one retaining member having at least four serially connected sections, each section predisposed to remain at an angle to each adjacent section, having an aperture in each end section and an aperture in the combined center sections, each aperture being larger than the shaft diameter. A second retaining member will rotatably retain one end portion of the first retaining member on one of the knob and equipment, and around the shaft. Retaining means are included for retaining the other of the end portions of the first retaining member on the other of the knob and equipment, and around the shaft. The center portions are arranged in a folded configuration on only one side of the shaft. As completely assembled, the first retaining member is folded and concealed within and between the knob and the associated piece of equipment.

BRIEF DESCRIPTION OF THE DRAWINGS

FIG. 3B is a perspective view of the element as finally formed.

FIG. 3C is a side view of the element as in FIG. 3B.

FIG. 4 is a partially cut-away view of the invention in a different application.

DETAILED DESCRIPTION OF A PREFERRED EMBODIMENT

Figure 1:
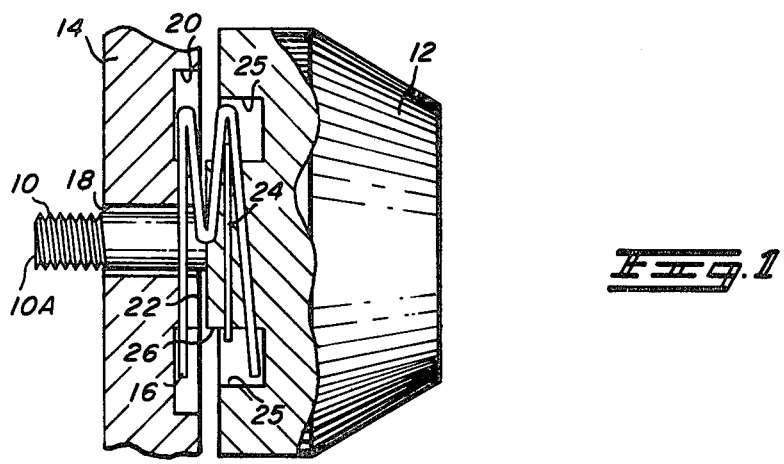
FIG. 1 is a partially cut-away view of one embodiment of the invention in the operative position.

The view of FIG. 1 is partially cut-away and shows an embodiment of the invention wherein a shaft and stud 10 is affixed to a knob 12. The shaft 10 may be of any desired shape and could be threaded (as shown) or slotted, keyed, etc. An end 10A would mate with some element (not shown) within an enclosure 14 (a wall portion only is shown). The knob and shaft could, for example, tighten the unseen mating element against the inner side of the enclosure wall 14. A four-section retaining member 16 (see FIGS. 3A, B, C) is concealed between the knob 12 and the outer surface of the enclosure wall 14, and performs no function in this operative position of the knob/shaft combination, but does allow free rotation of the shaft within a through bore 18 in the enclosure wall. One end section 16A (see FIG. 2) of the retaining member 16 is retained within a ring-shaped recess 20 as by a press fit around a shoulder portion 22 which is around the through bore 18. Other methods of attaching the member 16 to the wall 14 may be equally appropriate. The second end section 16B of the retaining member 16 is rotatably retained as by a retaining ring 24, within a recess 25 and around a shoulder 26 in the knob 12. It is obviously possible for either end section or both to be rotatably retained. The center sections 16C, 16D of the retaining member are shown here in the tightly folded position. It will be seen that the center sections of the retaining member 16 need not contact the knob 12, shaft 10 or wall 14.

Figure 2:
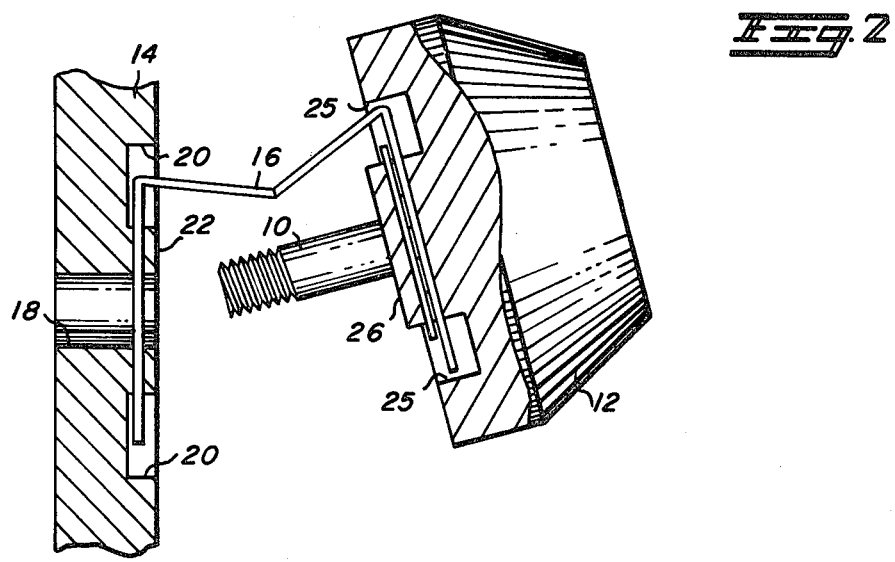
FIG. 2 is a view of the embodiment of FIG. 1 in the released position.

In FIG. 2, the same elements in the arrangement of FIG. 1 are seen with the shaft 10 separated from the unseen mating element within the enclosure wall 14, withdrawn from the through bore 18 and pulled to one side of the bore. It is to be noted that, if the retaining member 16 is sufficiently strong, relative to the weight of the hub/shaft combination, the combination may be held closer to or partially within the through bore 18 as desired.

Figure 3A:
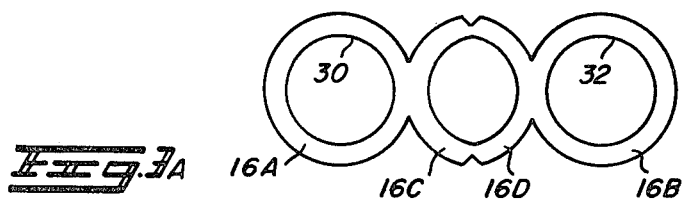
FIG. 3A is a plan view of a major element of FIGS. 1, 2 and 4 as first formed.

In FIGS. 3A, 3B and 3C, one specific embodiment of the retaining member may be seen. It is to be noted that, while a retaining member having four sections is shown and described herein, the principle of the invention will apply to a member having 2n sections, wherein n is an integer greater than one. FIG. 3A shows the form of the member 16 as first formed from a tough plastic such a polypropylene. It is within the scope of the invention that the retaining member 16 may be of any suitably strong material with the four sections hinged together as by metal hinges or by the so-called "living hinges" 28 (FIGS. 3B, 3C), which are integral to the material. Polypropylene is the preferred material for the present application of the invention and, as is known, has the highly desirable characteristic that repeated flexing improves the durability of the hinge, rather than causing fatigue of the material.

In FIGS. 3B and 3C, the retaining member 16 has been further formed to create the three hinge areas 28 and to shape the member into a wide "W". An aperture 30 in the end section 16A of the member 16 can be stretched over the shoulder 22 in the recess 20. An aperture 32 in the other end section 16B fits loosely around the shoulder 26 in the knob 12, so that the knob can rotate freely. The two center sections 16C, 16D as seen in FIGS. 1 and 2, fold up on one side of the shaft 10. The retaining member 16 may be shaped as three connected rings or, as in FIG. 3B, the center sections 16C, 16D may be shortened to form a somewhat elliptical shape. The exact configuration of the member 16 is not critical to the principle of the invention, but is largely a matter of design choice as long as the function is not interfered with. For example, both the recess 20 and the section 16A could have a common shape and common outside dimensions, round or otherwise. It is also possible that the section 16A could be designed to be visible around the knob if desired and even to carry any desired indicia.

In FIG. 4, a slightly different application is shown, including a device 34 such as a potentiometer, mounted on a wall portion 36 of an interior chassis as is known in the art. The shaft 10 is a part of the device 34 and projects through the through bore 18 to receive the knob 12. A control knob as for electrical equipment may be attached to such a shaft by a set screw 38 or by other known means. Since it is frequently necessary to remove a chassis from its enclosure for repair or adjustment, it would be desirable for all exterior knobs to be releasable but to be retained on the enclosure wall instead of being mislaid or lost. The retaining member 16 will function equally well regardless of whether the knob and shaft are permanently joined or not.

Thus there has been shown and described an arrangement for rotatably retaining a knob or knob/shaft combination on an enclosure wall after the knob or combination has been released from a mating device within the enclosure. It will be apparent that the arrangement of the invention has application to a wide range of fields where one object needs to be retained near its normal position when released from that position, and that other variations or modifications are possible. It is intended to cover all such as fall within the spirit and scope of the appended claims.

What is claimed is:

1. A retaining arrangement as for retaining a component on an associated piece of equipment, the equipment having an aperture in a wall thereof, and comprising:
   shaft;
   first retaining means having 2n serially connected sections, where n is an integer greater than one, each section predisposed to remain at an angle to each adjacent section, and having a first aperture in one end section, a second aperture in the other end section, and a third aperture in the combined center sections, each aperture being larger than the shaft diameter;
   second retaining means for rotatably retaining the first end section of the first retaining means on a first one of the component and the equipment and around the shaft;
   third retaining means for retaining the other of the end sections of the first retaining means on the other one of the component and the equipment and around the shaft; and
   wherein the center sections of the first retaining means are arranged in a folded configuration on only one side of the shaft.

2. A retaining arrangement in accordance with claim 1 and wherein the shaft and the component comprise one unit and the shaft is releasable from the associated piece of equipment.

3. A retaining arrangement in accordance with claim 2 wherein the shaft is threaded and the associated piece of equipment includes a second component having a threaded aperture for mating with the shaft.

4. A retaining arrangement in accordance with claim 3 wherein rotation of the first component causes tightening or release respectively of the second component against an inner surface of the piece of equipment.

5. A retaining arrangement in accordance with claim 1 wherein the second retaining means includes a retaining ring and the first one of the component and the equipment includes means for receiving the first end of the first retaining means and the retaining ring.

6. A retaining arrangement in accordance with claim 1 wherein the sections of the first retaining means are joined by hinge means.

7. A retaining arrangement in accordance with claim 1 wherein the first retaining member is formed of polypropylene.

8. A retaining arrangement in accordance with claim 7 wherein the sections of the first retaining member are joined by hinges of polypropylene.

9. A retaining arrangement in accordance with claim 1 and wherein the third retaining means includes a shoulder portion and a recess and wherein the outer surface of the shoulder portion provides a press fit for the aperture in one of the end portions of the first retaining means.

10. A retaining arrangement in accordance with claim 1 wherein the associated piece of equipment includes a second component and wherein the shaft forms a portion of the second component.

11. A retaining arrangement in accordance with claim 10 wherein rotation of the shaft changes a characteristic of the second component.

12. A retaining arrangement in accordance with claim 10 and further including fourth retaining means for releasably attaching the first component to the shaft.

13. A retaining arrangement in accordance with claim 1 wherein the extended length of the first retaining means, while attached at both ends, is greater than the length of the shaft.

14. A retaining arrangement in accordance with claim 1 wherein said one end section and said other end section comprise a first and second ring, respectively, said center sections comprising a third ring connected at a first edge to said first ring and connected at a second edge opposite said first edge to said second ring.

* * * * *